US012593233B2

(12) United States Patent
Yuan et al.

(10) Patent No.: US 12,593,233 B2
(45) Date of Patent: Mar. 31, 2026

(54) CHANNEL-SPECIFIC MAXIMUM PERMISSIBLE EXPOSURE REPORT

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/253,685

(22) PCT Filed: Jan. 15, 2021

(86) PCT No.: PCT/CN2021/072099
§ 371 (c)(1),
(2) Date: May 19, 2023

(87) PCT Pub. No.: WO2022/151337
PCT Pub. Date: Jul. 21, 2022

(65) Prior Publication Data
US 2024/0022940 A1    Jan. 18, 2024

(51) Int. Cl.
*H04W 24/10* (2009.01)
*H04W 52/36* (2009.01)

(52) U.S. Cl.
CPC ......... *H04W 24/10* (2013.01); *H04W 52/365* (2013.01); *H04W 52/367* (2013.01)

(58) Field of Classification Search
CPC .. H04W 24/10; H04W 52/365; H04W 52/367
See application file for complete search history.

(56) References Cited

U.S. PATENT DOCUMENTS

| | | | |
|---|---|---|---|
| 10,462,755 B2 | 10/2019 | Akkarakaran et al. | |
| 2010/0297993 A1* | 11/2010 | Heo ...................... | H04W 72/21 455/423 |
| 2019/0141692 A1 | 5/2019 | Subramanian et al. | |

(Continued)

FOREIGN PATENT DOCUMENTS

| | | |
|---|---|---|
| CN | 111436105 A | 7/2020 |
| CN | 112106411 A | 12/2020 |

(Continued)

OTHER PUBLICATIONS

WO2022123778 English translation (Year: 2022).*

(Continued)

*Primary Examiner* — Lester G Kincaid
(74) *Attorney, Agent, or Firm* — Harrity & Harrity LLP

(57) ABSTRACT

Various aspects of the present disclosure generally relate to wireless communication. In some aspects, a user equipment (UE) may generate a maximum permissible exposure (MPE) report for a subset of uplink channels included in a set of uplink channels to be used by the UE for transmitting uplink transmissions, wherein the MPE report includes: MPE reporting information for the subset of uplink channels and an identifier with which each uplink channel of the subset of uplink channels is associated. The UE may transmit the MPE report associated with the subset of uplink channels to a base station. Numerous other aspects are provided.

30 Claims, 6 Drawing Sheets

400 ➞

410 ～ Generate an MPE report for a subset of uplink channels included in a set of uplink channels to be used by a UE for transmitting uplink transmissions, wherein the MPE report includes MPE reporting information for the subset of uplink channels and an identifier with which each uplink channel of the subset of uplink channels is associated 420 ～ Transmit the MPE report associated with the subset of uplink channels to a base station

(56) References Cited

U.S. PATENT DOCUMENTS

| | | | | |
|---|---|---|---|---|
| 2019/0200365 A1 | | 6/2019 | Sampath et al. | |
| 2019/0349866 A1* | | 11/2019 | Lin | H04W 52/365 |
| 2020/0288412 A1 | | 9/2020 | Ajdakple et al. | |
| 2022/0006507 A1 | | 1/2022 | Guan et al. | |
| 2022/0078724 A1* | | 3/2022 | Chen | H04W 52/365 |
| 2023/0379843 A1* | | 11/2023 | Go | H04W 52/365 |

FOREIGN PATENT DOCUMENTS

| | | | | | |
|---|---|---|---|---|---|
| WO | 2018232127 | | 12/2018 | | |
| WO | 2019126264 | | 6/2019 | | |
| WO | 2020040911 | A1 | 2/2020 | | |
| WO | 2020076841 | | 4/2020 | | |
| WO | WO-2020111841 | A1 * | 6/2020 | | H04W 72/23 |
| WO | 2020192408 | A1 | 10/2020 | | |
| WO | WO-2022123778 | A1 * | 6/2022 | | H04W 24/10 |
| WO | 2022151121 | | 7/2022 | | |

OTHER PUBLICATIONS

Ahn (english translation) (Year: 2020).*
International Search Report and Written Opinion—PCT/CN2021/072099—ISA/EPO—Oct. 12, 2021.
Moderator (Samsung): "Moderator Summary#2 for Multi-Beam Enhancement: Proposal Categorization", 3GPP TSG RAN WG1 #102-e, R1-2007189, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 27, 2020, XP051922607, 27 Pages.
Qualcomm Incorporated: "Enhancements on Multi-Beam Operation", 3GPP TSG RAN WG1 Meeting #102-e, R1-2006790, 3rd Generation Partnership Project, Mobile Competence Centre, 650, Route Des Lucioles, F-06921, Sophia-Antipolis Cedex, France, vol. RAN WG1, No. Aug. 17, 2020-Aug. 28, 2020, 7 pages, Aug. 28, 2020, XP051918240, paragraph [0004], p. 6, Proposal 18.
NTT Docomo Inc: "Discussion on Multi-beam Operation", R1-2009174, 3GPP TSG RAN WG1 #103-e, 3rd Generation Partnership Project, Mobile Competence Centre, 650, Route Des Lucioles, F-06921 Sophia-Antipolis Cedex, France vol. RAN WG1, No. e-Meeting, Oct. 26, 2020-Nov. 13, 2020, Nov. 1, 2020, XP052351099, 22 Pages.
Supplementary European Search Report—EP21918544—Search Authority—The Hague—Sep. 9, 2024.
Oppo: "Enhancements on Multi-Beam Operation", 3GPP TSG RAN WG1 #102-e, R1-2005983, e-Meeting, Aug. 17-28, 2020, Aug. 7, 2020, 5 Pages.
Qualcomm Incorporated: "Enhancements on Multi-beam Operation", 3GPP TSG RAN WG1 Meeting #102-e, R1-2006790, Aug. 17-28, 2020, Aug. 8, 2020, pp. 1-7.
Qualcomm Incorporated: "Enhancements on Multi-beam Operation", 3GPP TSG RAN WG1 Meeting #103-e, R1-2009250, Oct. 26-Nov. 13, 2020, Nov. 2, 2020, 12 Pages.

* cited by examiner

302
Generate MPE report
for subset of UL channels
*(including MPE reporting info, identifier
associated with subset of UL channels)*

304
MPE report for subset
of UL channels

110

120

300

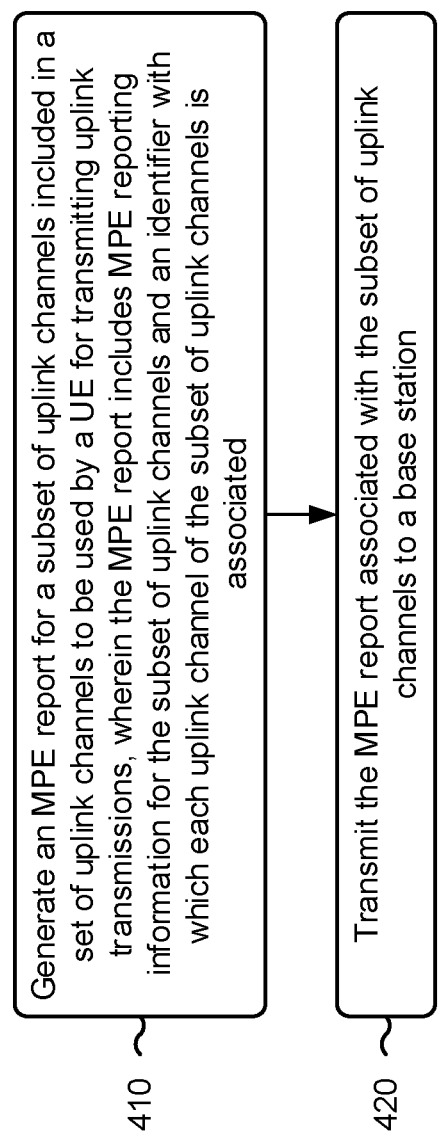

400

410   Generate an MPE report for a subset of uplink channels included in a set of uplink channels to be used by a UE for transmitting uplink transmissions, wherein the MPE report includes MPE reporting information for the subset of uplink channels and an identifier with which each uplink channel of the subset of uplink channels is associated 420   Transmit the MPE report associated with the subset of uplink channels to a base station

FIGURE 4

CHANNEL-SPECIFIC MAXIMUM PERMISSIBLE EXPOSURE REPORT

CROSS-REFERENCE TO RELATED APPLICATION

This Patent Application is a 371 National Stage of Patent Cooperation Treaty (PCT) Patent Application No. PCT/CN2021/072099, filed on Jan. 15, 2021, entitled "CHANNEL-SPECIFIC MAXIMUM PERMISSIBLE EXPOSURE REPORT," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for a channel-specific maximum permissible exposure report.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A regulatory exposure limit may be imposed on wireless communication devices, such as UEs, to limit exposure of users to radio frequency (RF) radiation. For example, a maximum permissible exposure (MPE) may be imposed on UEs operating in a frequency band above 6 GHz to limit exposure of users to RF radiation. In general, a UE is configured with a detector capable of detecting an occurrence of an exposure of the UE exceeding the MPE (herein referred to as an MPE event). Upon detection of the MPE event, the UE may perform a mitigation, such as applying a power reduction to uplink transmissions of the UE. The UE may also need to transmit an MPE report to a BS in order to provide the B S with information that allows the B S to schedule the UE for upcoming communications appropriately based on a power reduction applied by the UE. However, a conventional MPE report is cell-specific, and a reported metric is common to all panels of the UE. Therefore, a conventional MPE report is insufficient in a wireless communication system in which a transmission configuration indicator (TCI) framework utilizes separate TCI states to accommodate separate beam indications for uplink beams and downlink beams.

SUMMARY

In some aspects, a user equipment (UE) for wireless communication includes a memory; and one or more processors operatively coupled to the memory, the memory and the one or more processors configured to generate a maximum permissible exposure (MPE) report for a subset of uplink channels included in a set of uplink channels to be used by the UE for transmitting uplink transmissions, wherein MPE report includes MPE reporting information for the subset of uplink channels and an identifier with which each uplink channel of the subset of uplink channels is associated. The memory and the one or more processors transmit the MPE report associated with the subset of uplink channels to a base station.

In some aspects, a method of wireless communication performed by a UE includes generating an MPE report for a subset of uplink channels included in a set of uplink channels to be used by the UE for transmitting uplink transmissions, wherein the MPE report includes MPE reporting information for the subset of uplink channels and an identifier with which each uplink channel of the subset of uplink channels is associated. The method includes transmitting the MPE report associated with the subset of uplink channels to a base station.

In some aspects, a non-transitory computer-readable medium storing a set of instructions for wireless communication includes one or more instructions that, when executed by one or more processors of a UE, cause the UE to generate an MPE report for a subset of uplink channels included in a set of uplink channels to be used by the UE for transmitting uplink transmissions, wherein the MPE report includes MPE reporting information for the subset of uplink channels and an identifier with which each uplink channel of the subset of uplink channels is associated. The one or more instructions cause the UE to transmit the MPE report associated with the subset of uplink channels to a base station.

In some aspects, an apparatus for wireless communication includes means for generating an MPE report for a subset of uplink channels included in a set of uplink channels to be used by the apparatus for transmitting uplink transmissions, wherein the MPE report includes MPE reporting information for the subset of uplink channels and an identifier with which each uplink channel of the subset of uplink channels is associated. The apparatus includes means for transmitting the MPE report associated with the subset of uplink channels to a base station.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 4 is a flowchart illustrating an example process performed, for example, by a UE that supports channel-specific MPE reporting in accordance with various aspects of the present disclosure.

DETAILED DESCRIPTION

Figure 1:
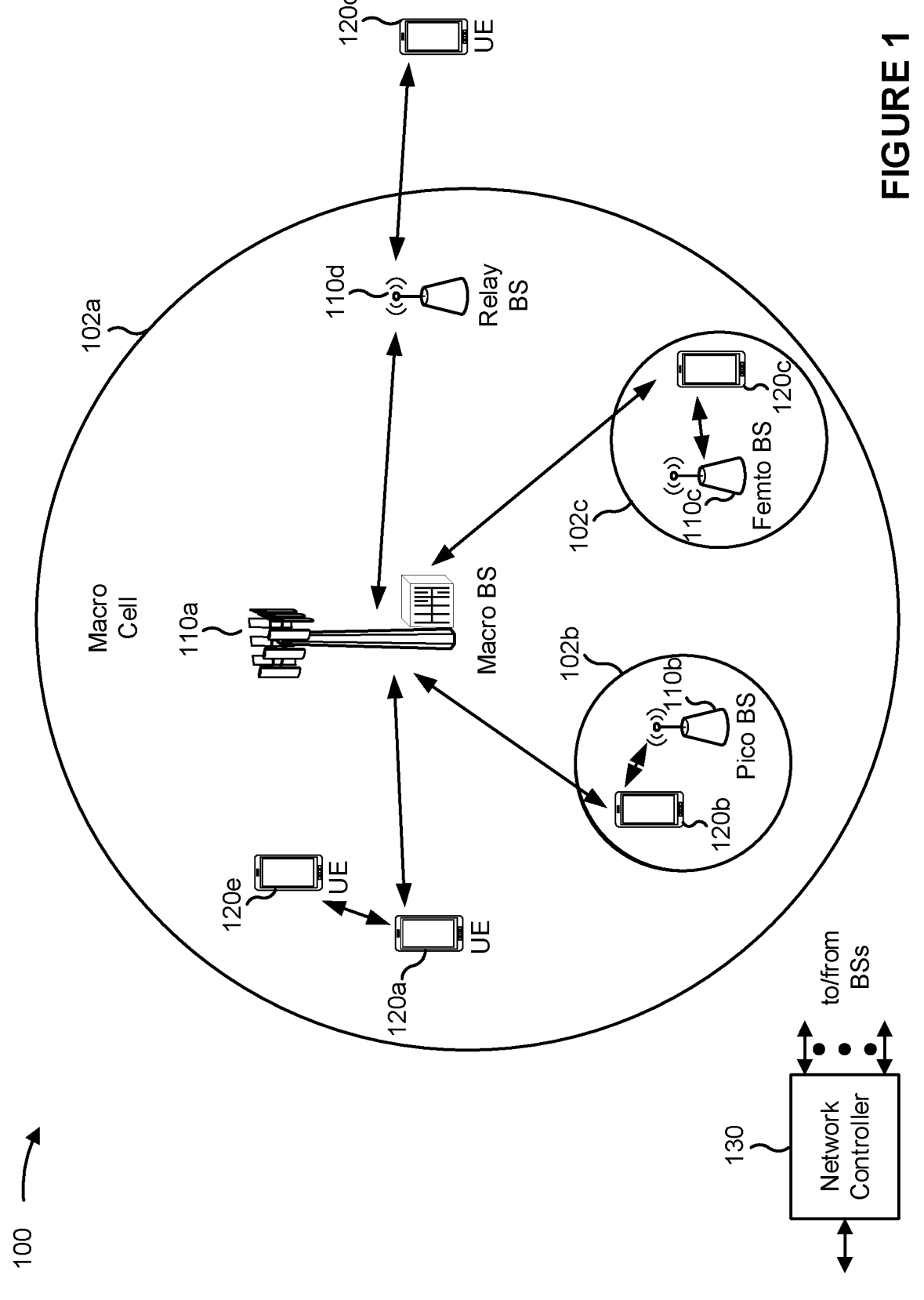
FIG. 1 is a diagram illustrating an example of a wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to channel-specific maximum permissible exposure (MPE) reporting. Some aspects more specifically relate to a UE generating and transmitting an MPE report that includes reporting information for a subset of one or more uplink channels included in a set of uplink channels that may be used by the UE for transmitting uplink transmissions, as well as an identifier with which each uplink channel of the subset of uplink channels is associated. In some aspects, the identifier may be, for example, an uplink channel type identifier, an uplink panel identifier, an uplink transmission configuration indicator (TCI) identifier, or a path loss reference signal (PL-RS) identifier. In some aspects, the MPE reporting information may include a value for a metric that is specific to the subset of uplink channels.

Particular aspects of the subject matter described in this disclosure can be implemented to realize one or more of the following potential advantages. In some examples, the described techniques enable a UE to generate and transmit channel-specific MPE reports that include reporting information on a channel-specific level. In some aspects, the transmitting of MPE reporting information on a channel-specific level enables a BS to be provided with information sufficient to adequately respond to a mitigation action taken by the UE after detection of an MPE event, thereby improving communication between the UE and the BS. For example, the BS may schedule uplink communications of the UE with a sufficient quantity of resource blocks (RBs) based on a power reduction indicated in the MPE report as being applied by the UE, which can improve reliability of communications between the UE and the BS.

FIG. 1 is a diagram illustrating an example of a wireless network in accordance with various aspects of the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 gigahertz (GHz). As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
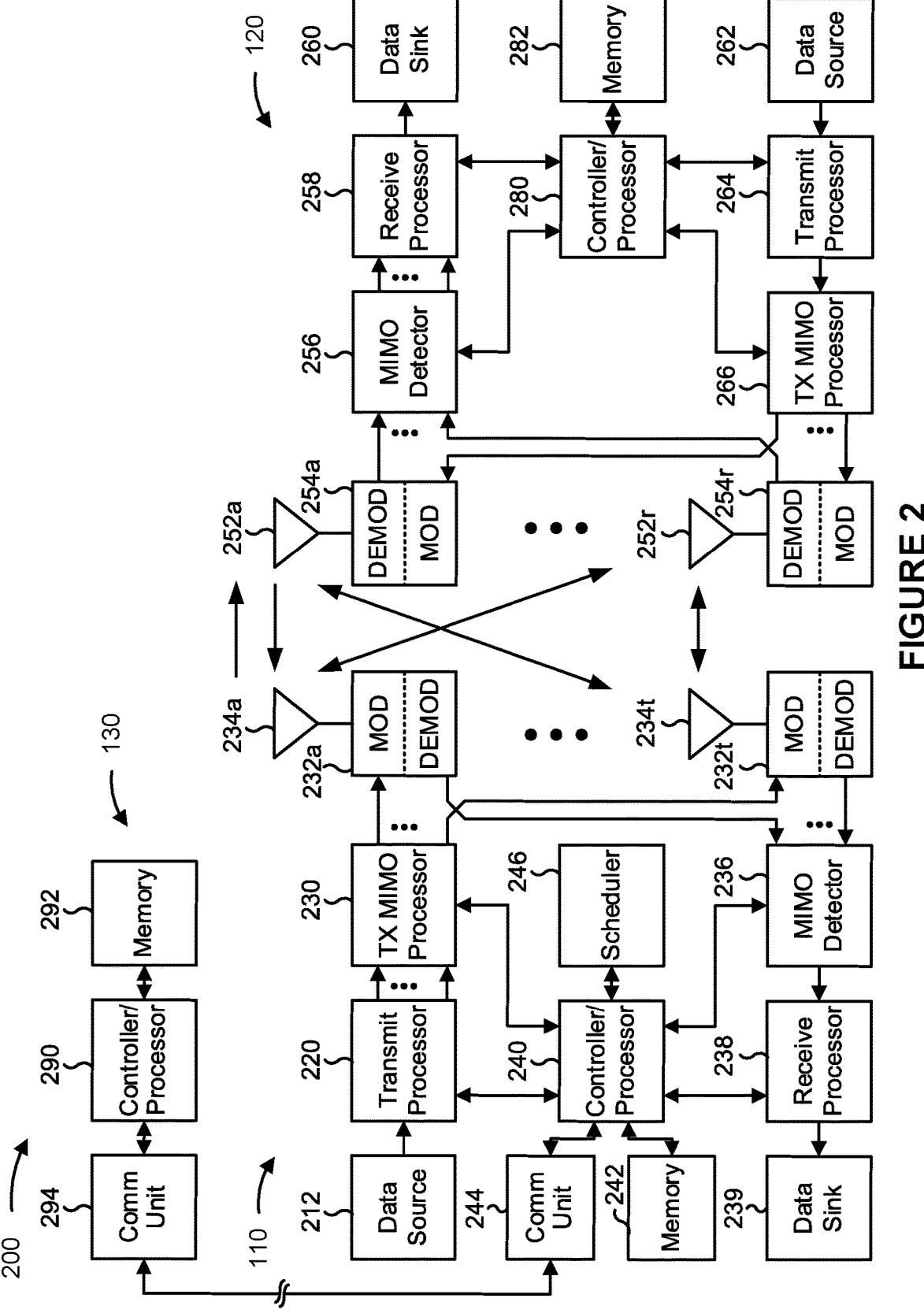
FIG. 2 is a diagram illustrating an example base station (BS) in communication with a user equipment (UE) in a wireless network in accordance with various aspects of the present disclosure.

FIG. 2 is a diagram illustrating an example base station in communication with a UE in a wireless network in accordance with various aspects of the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with a channel-specific maximum permissible exposure report, as described in more detail elsewhere herein. For example, controller/processor 240 of base station 110, controller/processor 280 of UE 120, or any other component(s) of FIG. 2 may perform or direct operations of, for example, process 400 of FIG. 4, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 400 of FIG. 4 or other processes as described herein. In some aspects, executing instructions may include running the instructions, converting the instructions, compiling the instructions, or interpreting the instructions, among other examples.

In some aspects, UE 120 includes means for generating a maximum permissible exposure (MPE) report for a subset of uplink channels included in a set of uplink channels to be used by UE 120 for transmitting uplink transmissions, wherein the MPE report includes MPE reporting information for the subset of uplink channels and an identifier with which each uplink channel of the subset of uplink channels is associated; means for transmitting the MPE report associated with the subset of uplink channels to a base station. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

A regulatory exposure limit may be imposed on wireless communication devices, such as UEs, to limit exposure of users to radio frequency (RF) radiation. For example, a maximum permissible exposure (MPE) may be imposed on UEs operating in a frequency band above 6 GHz to limit exposure of users to RF radiation. The MPE may be expressed, for example, as power per unit area (that is, a power density). In general, a UE is configured with a detector capable of detecting an occurrence of an exposure limit of the UE exceeding the MPE (herein referred to as an MPE event). Upon detection of the MPE event, the UE may perform a mitigation, such as applying a power reduction (for example, a power management maximum power reduction (P-MPR)) to uplink transmissions of the UE (for example, in a given serving cell of the UE). The UE may also need to transmit an MPE report to a BS with which the UE is communicating. The MPE report is intended to provide the BS with information that allows the BS to schedule the UE for upcoming communications appropriately (for example, with a sufficient quantity of resource blocks (RBs) given the applied power reduction) based on a power back-off applied by the UE. Conventionally, the MPE report is cell-specific, and a reported metric is common to all panels of the UE.

Additionally, a transmission configuration indicator (TCI) framework implemented in a wireless communication system may utilize separate TCI states to accommodate separate beam indications for uplink beams and downlink beams. For the downlink TCI state, source reference signal(s) in M (M≥1) TCIs provide quasi co-location (QCL) information at least for UE-dedicated reception on a physical downlink shared channel (PDSCH) and for UE-dedicated reception on all of or a subset of control resource sets (CORESETs) in a component carrier. For the uplink TCI state, source reference signal(s) in N (N≥1) TCIs provide a reference for determining common uplink transmission spatial filter(s) at least for a physical uplink shared channel (PUSCH) (for example, a dynamic-grant based PUSCH or a configured-grant based PUSCH) and for transmission on all of or a subset of dedicated physical uplink control channel (PUCCH) resources in a component carrier. Optionally, the uplink transmission spatial filter can also apply to all sounding reference signal (SRS) resources in resource set(s) configured for some uplink transmission (for example, antenna switching uplink transmissions, codebook-based uplink transmission, or non-codebook-based uplink transmissions). Further, to facilitate fast uplink panel selection and MPE mitigation, uplink transmit panels of the UE may be assumed to be the same as or a subset of downlink receive panels of the UE.

A number of observations can be made based on the above-described TCI framework. One observation is that the different types of uplink channels (for example, dynamic-grant based PUSCH, configured-grant based PUSCH, SRS, and PUCCH) may have different requirements for uplink transmissions, meaning that robustness to MPE events may vary among the uplink channels (depending on the uplink channel type). For example, for an uplink channel of a PUCCH or a PUSCH with a reported median level of MPE value, the BS may choose to schedule a smaller bandwidth for a next PUCCH or PUSCH transmission, which may mitigate the impact of the MPE event. Another observation is that a TCI state may be indicated for a set or subset of uplink channels of the UE, meaning that an MPE event may occur only to a subset of uplink channels or to uplink channels of a particular type. Another observation is that a TCI state may be indicated separately for a set or subset of uplink channels, meaning that an MPE report may need to include reporting information associated with a particular uplink TCI state. Another observation is that a set of uplink panels may be a subset of downlink panels, meaning that an MPE report may necessitate including reporting information associated with a particular set of uplink panels. Based on these observations it is clear that the UE may need to transmit an MPE report that is specific to a subset of uplink channels of the UE. However, conventional MPE reporting does not support reporting with such specificity, meaning that MPE reporting in the context of the above-described TCI framework does not allow a BS to adequately respond after an MPE event is detected and reported by a UE.

Various aspects relate generally to channel-specific MPE reporting. Some aspects more specifically relate to a UE generating and transmitting an MPE report that includes reporting information for a subset of uplink channels of the UE and an identifier with which each uplink channel of the subset of uplink channels is associated. In some aspects, the identifier may be, for example, an uplink channel type identifier, an uplink panel identifier, an uplink TCI identifier, or a PL-RS identifier. In some aspects, the MPE reporting information may include a value for a metric that is specific to the subset of uplink channels. Additional details are provided below.

Particular aspects of the subject matter described in this disclosure can be implemented to realize one or more of the following potential advantages. In some examples, the described techniques can be used to enable channel-specific MPE reporting by a UE. In some aspects, the channel-specific reporting capability enables the UE to transmit MPE reporting information on a channel-specific level, thereby providing a BS with information sufficient to adequately respond to a mitigation action taken by the UE after detection of an MPE event.

Figure 3A:
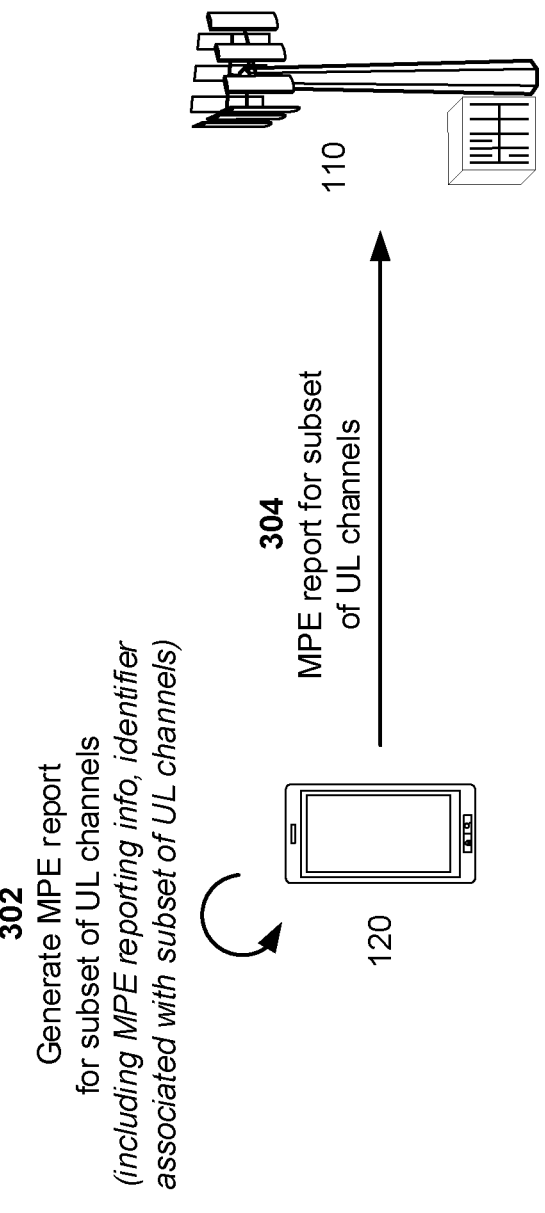
FIGS. 3A and 3B are diagrams illustrating an example associated with a channel-specific maximum permissible exposure (MPE) report in accordance with various aspects of the present disclosure.
Figure 3B:
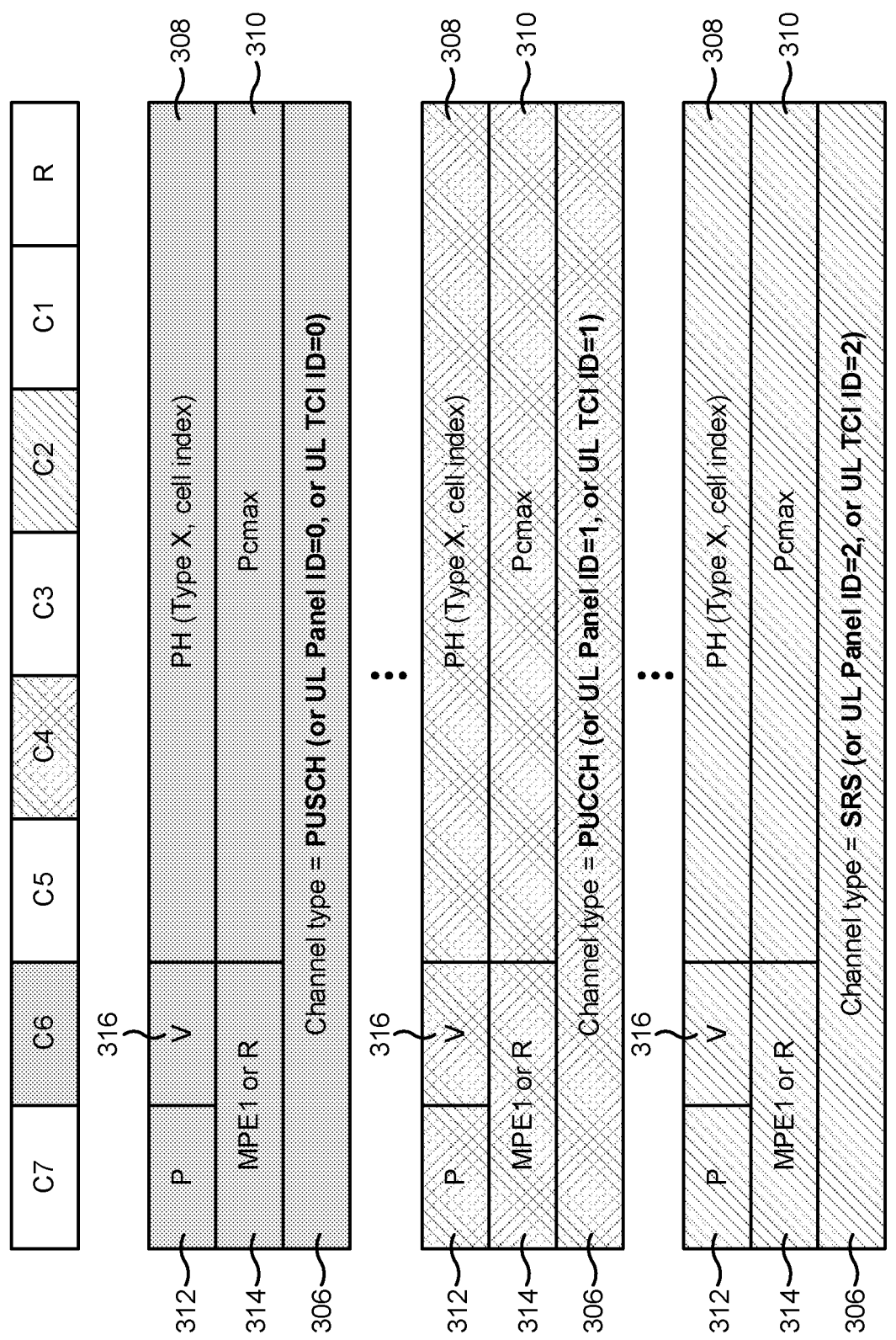

FIGS. 3A and 3B are diagrams illustrating an example 300 associated with a channel-specific MPE report, in accordance with various aspects of the present disclosure. As shown in FIG. 3A, example 300 includes communication between a BS 110 and a UE 120. In some aspects, BS 110 and UE 120 may be included in a wireless network, such as wireless network 100. BS 110 and UE 120 may communicate via a wireless access link, which may include an uplink and a downlink.

As shown in FIG. 3A, in a first operation 302, a UE (for example, a UE 120) generates an MPE report for a subset of uplink channels. Here, the subset of uplink channels includes one or more uplink channels from a set of uplink channels to be used by the UE for transmitting uplink transmissions. In some aspects, the UE generates the MPE report based at least in part on an event (for example, an MPE event) that, upon detection by the UE, triggers to the UE to generate an MPE report associated with at least the subset of uplink channels. In some aspects, the MPE report generated by the UE includes MPE reporting information for the subset of uplink channels and an identifier with which each uplink channel in the subset of uplink channels is associated. In some aspects, the MPE report may include MPE reporting information for multiple subsets of uplink channels and identifiers corresponding to each of the multiple subsets.

In some aspects, the identifier is an uplink channel type identifier that is associated with each uplink channel in the subset of uplink channels. That is, in some aspects, the identifier identifies an uplink channel type. The type of uplink channel may be, for example, SRS, PUCCH, a dynamic-grant based PUSCH, or a configured-grant based PUSCH, among other examples. As a particular example, the MPE report may comprise a power headroom report (PHR) that includes a power management maximum power reduction (P-MPR) value (also referred to as an MPE value). Here, the MPE report may indicate whether the PHR is Type I, Type II, or Type III, where Type I corresponds to PUSCH, Type II corresponds to PUCCH, and Type III corresponds to SRS.

In some aspects, the identifier is an uplink panel identifier that is associated with each uplink channel in the subset of uplink channels. In some aspects, the uplink panel identifier may be a compact panel identifier (as compared to a panel identifier associated with downlink identifier panels). As a particular example, downlink panels of the UE may be identified as panel A, panel B, panel C, and panel D, and the activated uplink panels of the UE may include panels B and C only (that is, the uplink panels may be a subset of the set of downlink panels). Here, the compact uplink panel identifier may be reported (for example, in a single bit) using a value of 0 or 1, where 0 refers to panel B, and 1 refers to panel C. An MPE report including an uplink panel identifier can be used when, for example, activated uplink panels of the UE are a subset of downlink panels of the UE.

In some implementations, the identifier is an uplink TCI identifier that is associated with each uplink channel in the subset of uplink channels. For example, a first uplink TCI state may be configured with a first set of PUSCHs and PUCCHs, and a second uplink TCI state may be configured with a second set of PUSCHs and PUCCHs. Here, the identifier may correspond to either the first TCI state or the second TCI state. An MPE report including an uplink TCI identifier may be used when, for example, when common uplink TCI states are applied to different sets of uplink channels.

In some aspects, the identifier is a PL-RS identifier that is associated with each uplink channel in the subset of uplink channels. An MPE report including a PL-RS identifier may be used when, for example, a PL-RS is reused for multiple different uplink channels.

The MPE reporting information may include, for example, a value of a reporting metric. Here, the value of the reporting metric is specific to the subset of uplink channels. That is, in some aspects, the value of the reporting metric can be dedicated to the subset of uplink channels corresponding to the identifier included in the MPE report. In some aspects, the reporting metric may include, for example, a power headroom (PH), a P-MPR, a maximum transmit power (Pcmax), or a Pcmax that accounts for a P-MPR, among other examples.

In some aspects, when generating the MPE report, the UE determines the value of the reporting metric based at least in part on whether an uplink transmission is scheduled in any uplink channel of the subset of uplink channels. For example, at a time at which the MPE report is triggered at the UE, the UE may determine whether an uplink transmission is scheduled in any uplink channels of the set of uplink channels. Here, if an uplink transmission is scheduled in an uplink channel of the subset of uplink channels, then the UE may determine the value of the reporting metric based at least in part on a set of transmission parameters associated with the uplink channel. Conversely, if no uplink transmission is scheduled in any uplink channel of the subset of uplink channels, then the UE may determine the value of the reporting metric based at least in part on a reference format associated with the set of uplink channels. The reference format may define a set of power control parameters including, for example, a PL-RS, a target power (P0), a closed loop index, a resource allocation, an uplink beam, or an uplink panel, among other examples. In some aspects, the MPE report may include an indication of whether the value of the reporting metric is based at least in part on a set of transmission parameters associated with an uplink channel in the subset of uplink channels or is based at least in part on a reference format associated with the subset of uplink channels.

In a second operation 304, the UE transmits the MPE report associated with the subset of uplink channels to a BS (for example, a BS 110). In some aspects, the BS may receive the MPE report and may utilize the channel-specific MPE reporting information accordingly (for example, to respond to a mitigation action taken by the UE after detection of an MPE event). For example, the BS may receive the MPE report and utilize the MPE reporting information when scheduling the UE for upcoming uplink communications in the subset of uplink channels appropriately (e.g., for example, by scheduling the UE with a sufficient quantity of RBs given a power reduction indicated as being applied by the UE).

FIG. 3B is a diagram illustrating an example of a channel-specific MPE report described herein. In the example shown in FIG. 3B, the top row comprises cell index indicators (C1 through C7, with a reserved bit R), and the three groups of rows below the top row of FIG. 3B comprise entries in an MPE report, each associated with one of the indicated cell index indicators (C6, C4, and C2). As shown, a given entry in the MPE report includes an identifier 306 that identifies a subset of uplink channels associated with the entry (for example, based on channel type, uplink panel, uplink TCI state, or PL-RS). As further shown, the given entry in the MPE report also includes a reporting metric value 308 (for example, a PH) for the subset of uplink channels. As further shown, the given entry in the MPE report may include one or more other values, such as a Pcmax value 310 for the subset of uplink channels or an MPE value 314 for the subset of uplink channels. In this example, a given entry in the MPE report includes a value 312 (in a "P" field) that indicates whether the value in the "MPE1 or R" field is an MPE (that is, a P-MPR) or is a reserved bit. As further shown, the given entry in the MPE report includes a value 316 (in a "V" field) that indicates whether values of one or more reporting metrics included in the entry were determined based on transmission parameters associated with a transmission in one of the subset of uplink channels or was determined based on a reference format associated with the subset of uplink channels.

FIG. 4 is a flowchart illustrating an example process 400 performed, for example, by a UE in accordance with various aspects of the present disclosure. Example process 400 is an example where the UE (for example, UE 120) performs operations associated with a channel-specific maximum permissible exposure report.

As shown in FIG. 4, in some aspects, process 400 may include generating an MPE report for a subset of uplink channels included in a set of uplink channels to be used by the UE for transmitting uplink transmissions, wherein the MPE report includes MPE reporting information for the subset of uplink channels and an identifier with which each uplink channel of the subset of uplink channels is associated (block 410). For example, the UE (such as by using MPE reporting component 510, depicted in FIG. 5) may generate an MPE report for a subset of uplink channels included in a set of uplink channels to be used by the UE for transmitting uplink transmissions, wherein the MPE report includes MPE reporting information for the subset of uplink channels and an identifier with which each uplink channel of the subset of uplink channels is associated, as described above.

As further shown in FIG. 4, in some aspects, process 400 may include transmitting the MPE report associated with the subset of uplink channels to a base station (block 420). For example, the UE (such as by using transmission component 506, depicted in FIG. 5) may transmit the MPE report associated with the subset of uplink channels to a base station, as described above.

Process 400 may include additional aspects, such as any single aspect or any combination of aspects described below or in connection with one or more other processes described elsewhere herein.

In a first additional aspect, the identifier is an uplink channel type identifier that is associated with each uplink channel in the subset of uplink channels.

In a second additional aspect, alone or in combination with the first aspect, the identifier is an uplink panel identifier that is associated with each uplink channel in the subset of uplink channels.

In a third additional aspect, alone or in combination with one or more of the first and second aspects, the identifier is an uplink TCI identifier that is associated with each uplink channel in the subset of uplink channels.

In a fourth additional aspect, alone or in combination with one or more of the first through third aspects, the identifier is a PL-RS identifier that is associated with each uplink channel in the subset of uplink channels.

In a fifth additional aspect, alone or in combination with one or more of the first through fourth aspects, the MPE reporting information includes a value of a reporting metric, the value of the reporting metric being specific to the subset of uplink channels.

In a sixth additional aspect, alone or in combination with one or more of the first through fifth aspects, the reporting metric is a PH, a P-MPR, a Pcmax, or a Pcmax that accounts for a P-MPR.

In a seventh additional aspect, alone or in combination with one or more of the first through sixth aspects, generating the MPE report comprises determining the value of the reporting metric based at least in part on whether an uplink transmission is scheduled in any uplink channel of the subset of uplink channels.

In an eighth additional aspect, alone or in combination with one or more of the first through seventh aspects, the value of the reporting metric is determined based at least in part on a set of transmission parameters associated with an uplink channel of the subset of uplink channels when an uplink transmission is scheduled in the uplink channel.

In a ninth additional aspect, alone or in combination with one or more of the first through eighth aspects, the value of the reporting metric is determined based at least in part on a reference format associated with the set of uplink channels when no uplink transmission is scheduled in any uplink channel of the subset of uplink channels.

In a tenth additional aspect, alone or in combination with one or more of the first through ninth aspects, the reference format defines a set of power control parameters including at least one of a PL-RS, a P0, a closed loop index, a resource allocation, an uplink beam, or an uplink panel.

In an eleventh additional aspect, alone or in combination with one or more of the first through tenth aspects, the MPE report includes an indication of whether the value of the reporting metric is based at least in part on a set of transmission parameters associated with an uplink channel in the subset of uplink channels or is based at least in part on a reference format associated with the subset of uplink channels.

Figure 5:
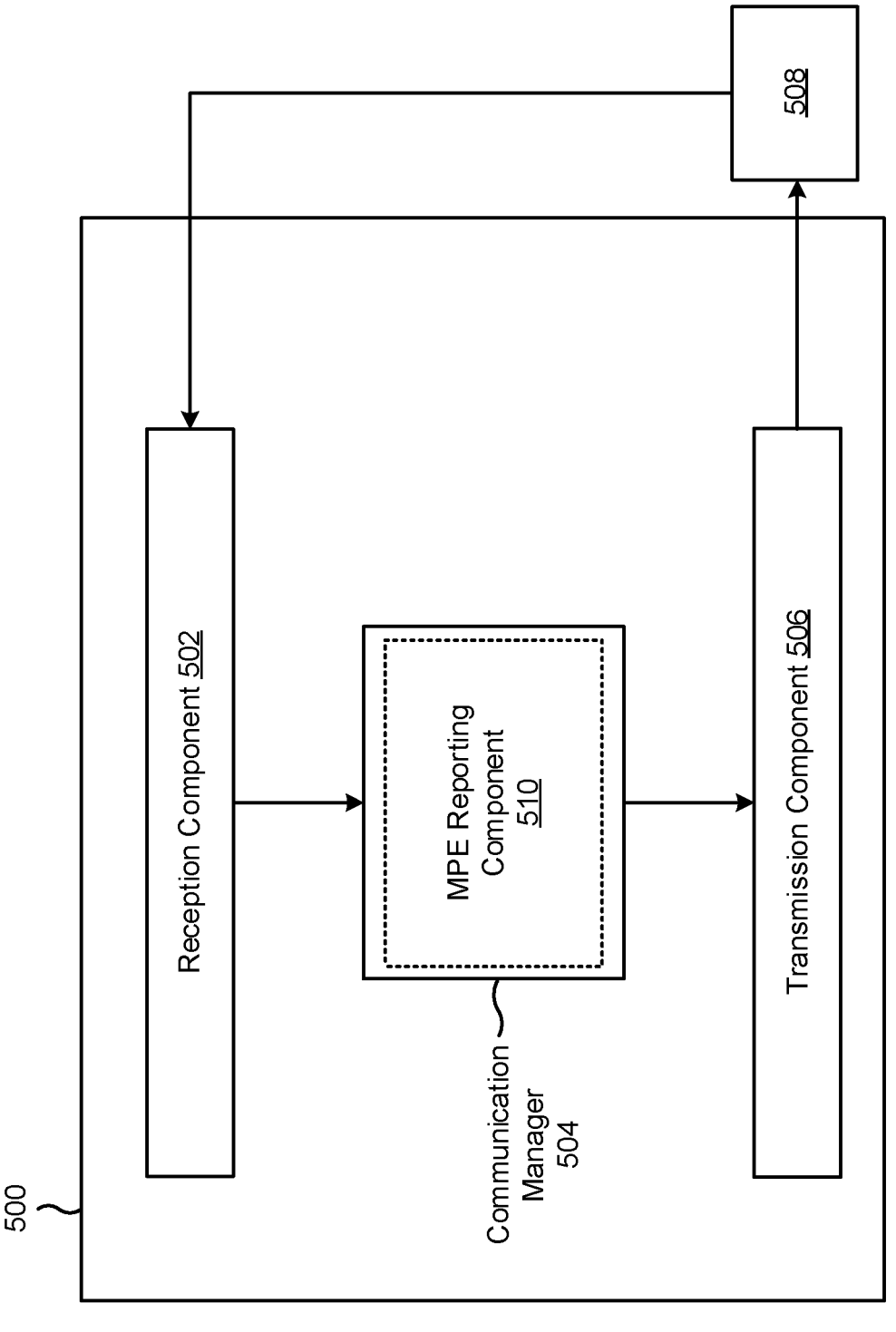
FIG. 5 is a block diagram of an example apparatus for wireless communication that supports channel-specific MPE reporting in accordance with various aspects of the present disclosure.

FIG. 5 is a block diagram of an example apparatus 500 for wireless communication in accordance with various aspects of the present disclosure. The apparatus 500 may be a UE, or a UE may include the apparatus 500. In some aspects, the apparatus 500 includes a reception component 502, a communication manager 504, and a transmission component 506, which may be in communication with one another (for example, via one or more buses). As shown, the apparatus 500 may communicate with another apparatus 508 (such as a UE, a base station, or another wireless communication device) using the reception component 502 and the transmission component 506.

In some aspects, the apparatus 500 may be configured to perform one or more operations described herein in connection with FIGS. 3A and 3B. Additionally or alternatively, the apparatus 500 may be configured to perform one or more processes described herein, such as process 400 of FIG. 4.

In some aspects, the apparatus 500 may include one or more components of the UE described above in connection with FIG. 2.

The reception component 502 may receive communications, such as reference signals, control information, data communications, or a combination thereof, from the apparatus 508. The reception component 502 may provide received communications to one or more other components of the apparatus 500, such as the communication manager 504. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 502 may include one or more antennas, a demodulator, a MIMO detector, a receive processor, a controller/processor, a memory, or a combination thereof, of the UE described above in connection with FIG. 2.

The transmission component 506 may transmit communications, such as reference signals, control information, data communications, or a combination thereof, to the apparatus 508. In some aspects, the communication manager 504 may generate communications and may transmit the generated communications to the transmission component 506 for transmission to the apparatus 508. In some aspects, the transmission component 506 may perform signal processing on the generated communications (such as filtering, amplification, modulation, digital-to-analog conversion, multiplexing, interleaving, mapping, or encoding, among other examples), and may transmit the processed signals to the apparatus 508. In some aspects, the transmission component 506 may include one or more antennas, a modulator, a transmit MIMO processor, a transmit processor, a controller/processor, a memory, or a combination thereof, of the UE described above in connection with FIG. 2. In some aspects, the transmission component 506 may be co-located with the reception component 502 in a transceiver.

The communication manager 504 may generate a MPE report for a subset of uplink channels included in a set of uplink channels to be used by the UE for transmitting uplink transmissions, wherein the MPE report includes MPE reporting information for the subset of uplink channels and an identifier with which each uplink channel of the subset of uplink channels is associated. The communication manager 504 may transmit or may cause the transmission component 506 to transmit the MPE report associated with the subset of uplink channels to a base station. In some aspects, the communication manager 504 may perform one or more operations described elsewhere herein as being performed by one or more components of the communication manager 504.

The communication manager 504 may include a controller/processor, a memory, or a combination thereof, of the UE described above in connection with FIG. 2. In some aspects, the communication manager 504 includes a set of components, such as an MPE reporting component 510. Alternatively, the set of components may be separate and distinct from the communication manager 504. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The MPE reporting component 510 may generate an MPE report for a subset of uplink channels included in a set of uplink channels to be used by the UE for transmitting uplink transmissions, wherein the MPE report includes MPE reporting information for the subset of uplink channels and an identifier with which each uplink channel of the subset of uplink channels is associated. The transmission component 506 may transmit the MPE report associated with the subset of uplink channels to a base station.

The following provides an overview of some aspects of the present disclosure:

Aspect 1: A method of wireless communication performed by a user equipment (UE), comprising: generating a maximum permissible exposure (MPE) report for a subset of uplink channels included in a set of uplink channels to be used by the UE for transmitting uplink transmissions, wherein the MPE report includes: MPE reporting information for the subset of uplink channels, and an identifier with which each uplink channel of the subset of uplink channels is associated; and transmitting the MPE report associated with the subset of uplink channels to a base station.

Aspect 2: The method of aspect 1, wherein the identifier is an uplink channel type identifier that is associated with each uplink channel in the subset of uplink channels.

Aspect 3: The method of any of aspects 1-2, wherein the identifier is an uplink panel identifier that is associated with each uplink channel in the subset of uplink channels.

Aspect 4: The method of any of aspects 1-3, wherein the identifier is an uplink transmission configuration indicator (TCI) identifier that is associated with each uplink channel in the subset of uplink channels.

Aspect 5: The method of any of aspects 1-4, wherein the identifier is a path loss reference signal (PL-RS) identifier that is associated with each uplink channel in the subset of uplink channels.

Aspect 6: The method of any of aspects 1-5, wherein the MPE reporting information includes a value of a reporting metric, the value of the reporting metric being specific to the subset of uplink channels.

Aspect 7: The method of aspect 6, wherein the reporting metric is a power headroom (PH), a power management maximum power reduction (P-MPR), a maximum transmit power (Pcmax), or a Pcmax that accounts for a P-MPR.

Aspect 8: The method of any of aspects 6-7, wherein generating the MPE report comprises determining the value of the reporting metric based at least in part on whether an uplink transmission is scheduled in any uplink channel of the subset of uplink channels.

Aspect 9: The method of any of aspects 6-8, wherein the value of the reporting metric is determined based at least in part on a set of transmission parameters associated with an uplink channel of the subset of uplink channels when an uplink transmission is scheduled in the uplink channel.

Aspect 10: The method of any of aspects 6-9, wherein the value of the reporting metric is determined based at least in part on a reference format associated with the set of uplink channels when no uplink transmission is scheduled in any uplink channel of the subset of uplink channels.

Aspect 11: The method of aspect 10, wherein the reference format defines a set of power control parameters including at least one of a path loss reference signal (PL- RS), a target power (P0), a closed loop index, a resource allocation, an uplink beam, or an uplink panel.

Aspect 12: The method of any of aspects 6-11, wherein the MPE report includes an indication of whether the value of the reporting metric is based at least in part on a set of transmission parameters associated with an uplink channel in the subset of uplink channels or is based at least in part on a reference format associated with the subset of uplink channels.

Aspect 13: An apparatus for wireless communication at a device, comprising a processor; memory coupled with the processor; and instructions stored in the memory and executable by the processor to cause the apparatus to perform the method of one or more aspects of aspects 1-12.

Aspect 14: A device for wireless communication, comprising a memory and one or more processors coupled to the memory, the memory and the one or more processors configured to perform the method of one or more aspects of aspects 1-12.

Aspect 15: An apparatus for wireless communication, comprising at least one means for performing the method of one or more aspects of aspects 1-12.

Aspect 16: A non-transitory computer-readable medium storing code for wireless communication, the code comprising instructions executable by a processor to perform the method of one or more aspects of aspects 1-12.

Aspect 17: A non-transitory computer-readable medium storing a set of instructions for wireless communication, the set of instructions comprising one or more instructions that, when executed by one or more processors of a device, cause the device to perform the method of one or more aspects of aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

a memory; and one or more processors operatively coupled to the memory, the memory and the one or more processors configured to:

generate a maximum permissible exposure (MPE) report for a subset of uplink channels included in a set of uplink channels to be used by the UE for transmitting uplink transmissions, wherein the MPE report includes:

a power headroom (PH) for the subset of uplink channels, and an uplink transmission configuration indicator (TCI) identifier with which each uplink channel of the subset of uplink channels is associated, wherein the PH is specific to the subset of uplink channels corresponding to the identifier; and transmit the MPE report associated with the subset of uplink channels to a network entity.

2. The UE of claim 1, wherein the MPE report further includes a value of a reporting metric, the value of the reporting metric being specific to the subset of uplink channels.

3. The UE of claim 2, wherein the reporting metric is a power management maximum power reduction (P-MPR), a maximum transmit power (Pcmax), or a Pcmax that accounts for a P-MPR.

4. The UE of claim 2, wherein the one or more processors, when generating the MPE report, are configured to determine the value of the reporting metric based at least in part on whether an uplink transmission is scheduled in any uplink channel of the subset of uplink channels.

5. The UE of claim 4, wherein the value of the reporting metric is determined based at least in part on a set of transmission parameters associated with an uplink channel of the subset of uplink channels in accordance with an uplink transmission being scheduled in the uplink channel.

6. The UE of claim 4, wherein the value of the reporting metric is determined based at least in part on a reference format associated with the set of uplink channels in accordance with no uplink transmission being scheduled in any uplink channel of the subset of uplink channels.

7. The UE of claim 6, wherein the reference format defines a set of power control parameters including at least one of a path loss reference signal (PL-RS), a target power (P0), a closed loop index, a resource allocation, an uplink beam, or an uplink panel.

8. The UE of claim 2, wherein the MPE report includes an indication of whether the value of the reporting metric is based at least in part on a set of transmission parameters associated with an uplink channel in the subset of uplink channels or is based at least in part on a reference format associated with the subset of uplink channels.

9. A method of wireless communication performed by a user equipment (UE), comprising:

generating a maximum permissible exposure (MPE) report for a subset of uplink channels included in a set of uplink channels to be used by the UE for transmitting uplink transmissions, wherein the MPE report includes:

a power headroom (PH) for the subset of uplink channels, and an uplink transmission configuration indicator (TCI) identifier with which each uplink channel of the subset of uplink channels is associated, wherein the PH is specific to the subset of uplink channels corresponding to the identifier; and transmitting the MPE report associated with the subset of uplink channels to a network node.

10. The method of claim 9, wherein the MPE report further includes a value of a reporting metric, the value of the reporting metric being specific to the subset of uplink channels.

11. The method of claim 10, wherein the reporting metric is a power management maximum power reduction (P-MPR), a maximum transmit power (Pcmax), or a Pcmax that accounts for a P-MPR.

12. The method of claim 10, wherein generating the MPE report comprises determining the value of the reporting metric based at least in part on whether an uplink transmission is scheduled in any uplink channel of the subset of uplink channels.

13. The method of claim 12, wherein the value of the reporting metric is determined based at least in part on a set of transmission parameters associated with an uplink channel of the subset of uplink channels in accordance with an uplink transmission being scheduled in the uplink channel.

14. The method of claim 12, wherein the value of the reporting metric is determined based at least in part on a reference format associated with the set of uplink channels in accordance with no uplink transmission being scheduled in any uplink channel of the subset of uplink channels.

15. The method of claim 14, wherein the reference format defines a set of power control parameters including at least one of a path loss reference signal (PL-RS), a target power (P0), a closed loop index, a resource allocation, an uplink beam, or an uplink panel.

16. The method of claim 10, wherein the MPE report includes an indication of whether the value of the reporting metric is based at least in part on a set of transmission parameters associated with an uplink channel in the subset of uplink channels or is based at least in part on a reference format associated with the subset of uplink channels.

17. A non-transitory computer-readable medium storing a set of instructions for wireless communication, the set of instructions comprising:

one or more instructions that, when executed by one or more processors of a user equipment (UE), cause the UE to:

generate a maximum permissible exposure (MPE) report for a subset of uplink channels included in a set of uplink channels to be used by the UE for transmitting uplink transmissions, wherein the MPE report includes:

a power headroom (PH) for the subset of uplink channels, and an uplink transmission configuration indicator (TCI) identifier with which each uplink channel of the subset of uplink channels is associated, wherein the PH is specific to the subset of uplink channels corresponding to the identifier; and transmit the MPE report associated with the subset of uplink channels to a network node.

18. The non-transitory computer-readable medium of claim 17, wherein the MPE report further includes a value of a reporting metric, the value of the reporting metric being specific to the subset of uplink channels.

19. The non-transitory computer-readable medium of claim 18, wherein the reporting metric is a power management maximum power reduction (P-MPR), a maximum transmit power (Pcmax), or a Pcmax that accounts for a P-MPR.

20. The non-transitory computer-readable medium of claim 18, wherein the one or more instructions, when executed by the one or more processors to cause the UE to generate the MPE report, further cause the UE to determine the value of the reporting metric based at least in part on whether an uplink transmission is scheduled in any uplink channel of the subset of uplink channels.

21. The non-transitory computer-readable medium of claim 20, wherein the value of the reporting metric is determined based at least in part on a set of transmission parameters associated with an uplink channel of the subset of uplink channels in accordance with an uplink transmission being scheduled in the uplink channel.

22. The non-transitory computer-readable medium of claim 20, wherein the value of the reporting metric is determined based at least in part on a reference format associated with the set of uplink channels in accordance with no uplink transmission being scheduled in any uplink channel of the subset of uplink channels.

23. The non-transitory computer-readable medium of claim 22, wherein the reference format defines a set of power control parameters including at least one of a path loss reference signal (PL-RS), a target power (P0), a closed loop index, a resource allocation, an uplink beam, or an uplink panel.

24. The non-transitory computer-readable medium of claim 18, wherein the MPE report includes an indication of whether the value of the reporting metric is based at least in part on a set of transmission parameters associated with an uplink channel in the subset of uplink channels or is based at least in part on a reference format associated with the subset of uplink channels.

25. An apparatus for wireless communication, comprising:

means for generating a maximum permissible exposure (MPE) report for a subset of uplink channels included in a set of uplink channels to be used by the apparatus for transmitting uplink transmissions, wherein the MPE report includes:

a power headroom (PH) for the subset of uplink channels, and an uplink transmission configuration indicator (TCI) identifier with which each uplink channel of the subset of uplink channels is associated wherein the PH is specific to the subset of uplink channels corresponding to the identifier; and means for transmitting the MPE report associated with the subset of uplink channels to a network node.

26. The apparatus of claim 25, wherein the MPE report further includes a value of a reporting metric, the value of the reporting metric being specific to the subset of uplink channels.

27. The apparatus of claim 26, wherein the reporting metric is a power management maximum power reduction (P-MPR), a maximum transmit power (Pcmax), or a Pcmax that accounts for a P-MPR.

28. The apparatus of claim 26, wherein the means to generate the MPE report comprise means to determine the value of the reporting metric based at least in part on whether an uplink transmission is scheduled in any uplink channel of the subset of uplink channels.

29. The apparatus of claim 28, wherein the value of the reporting metric is determined based at least in part on a set of transmission parameters associated with an uplink channel of the subset of uplink channels in accordance with an uplink transmission being scheduled in the uplink channel.

30. The apparatus of claim 28, wherein the value of the reporting metric is determined based at least in part on a reference format associated with the set of uplink channels in accordance with no uplink transmission being scheduled in any uplink channel of the subset of uplink channels.

* * * * *